UNITED STATES PATENT OFFICE.

OTTO P. AMEND, OF NEW YORK, AND JOSIAH H. MACY, OF HARRISON, NEW YORK.

PROCESS OF DESULFURING PETROLEUM DISTILLATES.

SPECIFICATION forming part of Letters Patent No. 551,941, dated December 24, 1895.

Application filed April 27, 1895. Serial No. 547,409. (No specimens.)

*To all whom it may concern:*

Be it known that we, OTTO P. AMEND, residing at New York, county of New York, and JOSIAH H. MACY, residing at Harrison, county of Westchester, State of New York, citizens of the United States, have invented certain new and useful Improvements in Processes of Treating and Desulphurizing Petroleum Oils and Distillates, of which the following is a specification.

It is well known that much difficulty has been experienced in removing sulphur and organic sulphur compounds from petroleum oils and distillates.

We have found that while water or even minute quantities of moisture remain in petroleum oil or distillate it has not been possible to eliminate all of the sulphur or organic sulphur compounds therefrom; but we have also found that upon agitating the oil or distillate and exposing the sulphur and organic sulphur compounds therein to the action of one or more of the oxides or hydrates of the alkalies or alkaline earths, or to the action of both oxide and hydrate and heating the oil or distillate with the alkali and effecting a perfect dehydration of the oil or distillate, new sulphur compounds are formed, which are insoluble in a dehydrated oil and are precipitated when dehydration is effected and are removable. By this means all sulphur and organic sulphur compounds in petroleum can be eliminated.

In carrying out the invention all visible water is removed from the oil or distillate and the sulphur or organic sulphur compounds therein are exposed to the action of an oxide or hydrate of an alkali or alkaline earth or to a combination of both oxide and hydrate by any well-known mechanical means that will effect intimate association. The oil or distillate is heated to a temperature ranging from 30° centigrade to 95° centigrade for the naphthas and burning oil. The temperature varies according to the specific gravity of the oil or distillate. The heating may be carried on simultaneously with the exposure of the sulphur compounds in the oil to the action of the alkali providing no acid is present in the oil. If the oil or distillate has been treated with acid, the acid should be neutralized before heating, as the presence of acid while heating will impart a lasting color to the oil. The heat applied operates to separate the water from the oil, which in all cases is a hydrated oil or distillate, until perfect dehydration is effected. This is completed by the introduction of terra alba, (oxide of alumina,) calcium oxide or other suitable dehydrating agent into the oil or distillate and heating the distillate and by thorough agitation. Upon effecting complete dehydration of the oil or distillate, as described, all of the sulphur and organic sulphur compounds therein are acted upon by the alkali or alkaline earth used for the purpose and form new sulphur compounds and precipitate. The oil or distillate is then drawn away from the sulphur precipitate and upon test is found to be free from sulphur. The distillate may then be treated with acid for further refinement or it may be treated with acid before desulphurization. The former plan is the most satisfactory and produces the whitest finished oil.

The quantity of alkali or the oxide or hydrate of calcium required to insure the removal of all the sulphur and sulphur compounds is from one to one and a half per cent. of the weight of the oil to be purified; but it must not be forgotten that if only enough alkali is employed to effect dehydration an additional supply of dry alkali must be introduced into the oil to act upon the sulphur or sulphur compounds, as that already used will be saturated with moisture and the sulphur compounds are soluble in water.

The quantity of dehydrating agent employed depends on the character or kind of oil, its specific gravity, and the quantity of water in the oil. It will vary under these conditions; but an ample supply must be used to effect dehydration regardless of quantity. A hydrated oil always means sulphur if the oil originally contained sulphur, and to eliminate the sulphur perfect dehydration must be effected.

Having described our invention, what we claim as new, and desire to secure by Letters Patent of the United States, is—

The process of eliminating sulphur or organic sulphur compounds from petroleum oil or distillate which consists: in subjecting the oil or distillate containing sulphur or organic sulphur compounds to the action of an oxide or hydrate of an alkali or alkaline earth or to a combination of both oxide and hydrate by bringing the same in contact each with the other and agitating them or one of them; in heating the oil or distillate and the contents thereof; in effecting the dehydration of the oil or distillate by introducing therein and agitating therewith one or more dehydrating agents as terra alba (oxide of alumina), calcium oxide or other dehydrating agent and precipitating the new sulphur compounds, which are formed by the action of the alkali or alkaline earth upon the sulphur or organic sulphur compounds in the oil and then separating the oil or distillate from the precipitate, substantially as described.

OTTO P. AMEND.
JOSIAH H. MACY.

Witnesses:
ARTHUR T. CLARK,
ANDREW SCHENCK.